(12) United States Patent
Wang et al.

(10) Patent No.: US 8,118,608 B2
(45) Date of Patent: Feb. 21, 2012

(54) ELECTRICAL CONNECTOR HAVING DETECTING TERMINALS FORMED FROM THE SAME TERMINAL BLANK AND METHOD OF MAKING THE SAME

(75) Inventors: Xiao-Hui Wang, Kunshan (CN); Yun-Jen Lee, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 74 days.

(21) Appl. No.: 12/702,334

(22) Filed: Feb. 9, 2010

(65) Prior Publication Data

US 2010/0210145 A1  Aug. 19, 2010

(30) Foreign Application Priority Data

Feb. 17, 2009 (CN) .......................... 2009 1 0024631

(51) Int. Cl.
*H01R 29/00* (2006.01)
(52) U.S. Cl. ..................................................... 439/188
(58) Field of Classification Search .................. 439/188, 439/489, 885; 200/51.09
See application file for complete search history.

(56) References Cited

U.S. PATENT DOCUMENTS

| | | | | |
|---|---|---|---|---|
| 5,860,821 A | * | 1/1999 | Pernet | 439/188 |
| 5,924,881 A | * | 7/1999 | Yasushi et al. | 439/188 |
| 6,073,853 A | * | 6/2000 | Odic | 235/486 |
| 6,431,893 B1 | * | 8/2002 | Chang et al. | 439/188 |
| 6,576,853 B2 | * | 6/2003 | Motojima | 200/51.09 |
| 6,902,407 B2 | * | 6/2005 | Ito et al. | 439/60 |
| 7,318,734 B2 | * | 1/2008 | Lee et al. | 439/188 |
| 2006/0063422 A1 | * | 3/2006 | Lu et al. | 439/489 |
| 2008/0132110 A1 | | 6/2008 | Lai et al. | |

FOREIGN PATENT DOCUMENTS

CN 2847573 Y 12/2006
CN 201038366 3/2008

\* cited by examiner

*Primary Examiner* — Neil Abrams
(74) *Attorney, Agent, or Firm* — Ming Chieh Chang; Wei Te Chung; Andrew C. Cheng

(57) ABSTRACT

An electrical connector (100) includes an insulative housing (1) and a number of terminals made from a same carrier strip. The terminals include a number of conductive terminals (2), a first and second detecting terminals (4, 3) inserted in the insulative housing in a juxtaposed manner. The conductive terminals and the first detecting terminal each has a front bent constituting a respective contact portion (21, 41). The contact portions of the conductive terminals and the contact portion of the first detecting terminal have a substantially same configuration. The first detecting terminal has an engaging portion (44) spaced from the second detecting terminal and contactable with the second detecting terminal.

7 Claims, 6 Drawing Sheets

US 8,118,608 B2

ELECTRICAL CONNECTOR HAVING DETECTING TERMINALS FORMED FROM THE SAME TERMINAL BLANK AND METHOD OF MAKING THE SAME

BACKGROUND OF THE INVENTION

1. Field of the Invention

The present invention relates to an electrical connector, and particularly to a card connector having a pair of detecting terminals formed from the same terminal blank. The present invention also relates to a method for making the same.

2. Description of Related Art

CN. Patent No. 2847573Y issued to Molex on Dec. 13, 2006 discloses a card connector. The card connector comprises an insulative housing, a plurality of conductive terminals and a pair of detecting terminals secured in the insulative housing, and a shielding attached to a top portion of the insulative housing. Each conductive terminal comprises a body portion and a contact portion extending forwardly from the body portion. The pair of detecting terminals comprise a first and a second detecting terminals. The first detecting terminal has a body portion and a U-shaped contact portion extending from the body portion and bent backwardly. The second detecting terminal extends along a direction perpendicular to that of the first detecting terminal.

The conductive terminals, the first detecting terminal and the second detecting terminal are configured different from each other and have to be stamped from different terminal blank. The process is comparably less cost-effective.

U.S. Pub. No. 2008/0132110 published on Jun. 5, 2008 discloses a card connector. The card connector comprises an insulative housing, a plurality of conductive terminals, a first and a second detecting terminals mounted in the insulative housing, and a shielding attached to the insulative housing. The conductive terminal is formed with a contact portion. The first detecting terminal is formed with an engaging portion projecting toward the second detecting terminal. The first detecting terminal has also been provided with the engaging portion bent backwardly and cantilevered above the second detecting terminal.

The contact portions of the conductive terminals are bent by a first mold in a first work station. The engaging portion of the first detecting terminal is bent backwardly by a second mold in a second work station. It has to go through different work stations and molds to complete the manufacturing of the conductive terminals and the first detecting terminal. Therefore, it would complicate the manufacturing process and would result in material waste.

Hence, an electrical connector having improved detecting terminals is required to overcome the above-mentioned disadvantages of the related art.

SUMMARY OF THE INVENTION

An object of the present invention is to provide an electrical connector having improved conductive terminals and detecting terminals stamped from a same terminal blank or carrier strip and formed simultaneously by a same mold to save material and as well as simplify the manufacture process.

To achieve the aforementioned objects, an electrical connector includes an insulative housing and a plurality of terminals stamped out from a carrier strip. The terminals comprise a plurality of conductive terminals, a first and second detecting terminals inserted in the insulative housing in a juxtaposed manner. The conductive terminals and the first detecting terminal each have a front bent portion constituting a contact portion. The contact portions of the conductive terminals and the contact portion of the first detecting terminal have a substantially same configuration. The first detecting terminal has an engaging portion spaced from the second detecting terminal and contactable with the second detecting terminal.

The conductive terminals, the first detecting terminal and the second detecting terminal are stamped out from the same carrier strip, to save material. Additionally, the contact portions of the conductive terminals and the first detecting terminals are bent into a same configuration by a same mold. It needs only one mold to form the contact portions of the conductive terminals and the contact portions of the first detecting terminal simultaneously, to thereby simplify the bending process.

Other objects, advantages and novel features of the invention will become more apparent from the following detailed description of a preferred embodiment when taken in conjunction with the accompanying drawings.

DETAILED DESCRIPTION OF THE INVENTION

Figure 1:
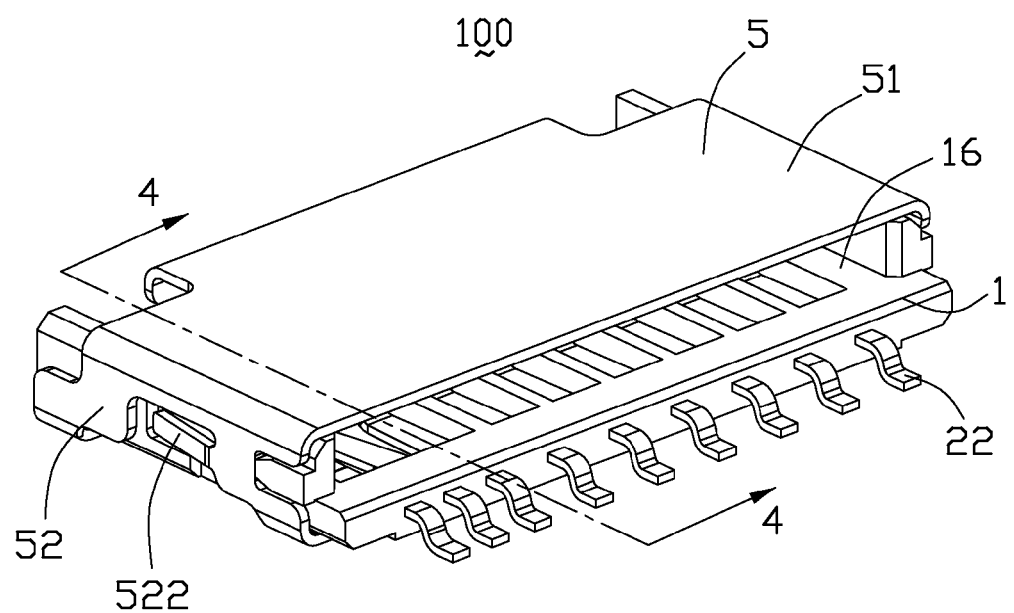
FIG. 1 is an assembled perspective view of the electrical connector in accordance with the present invention.
Figure 2:
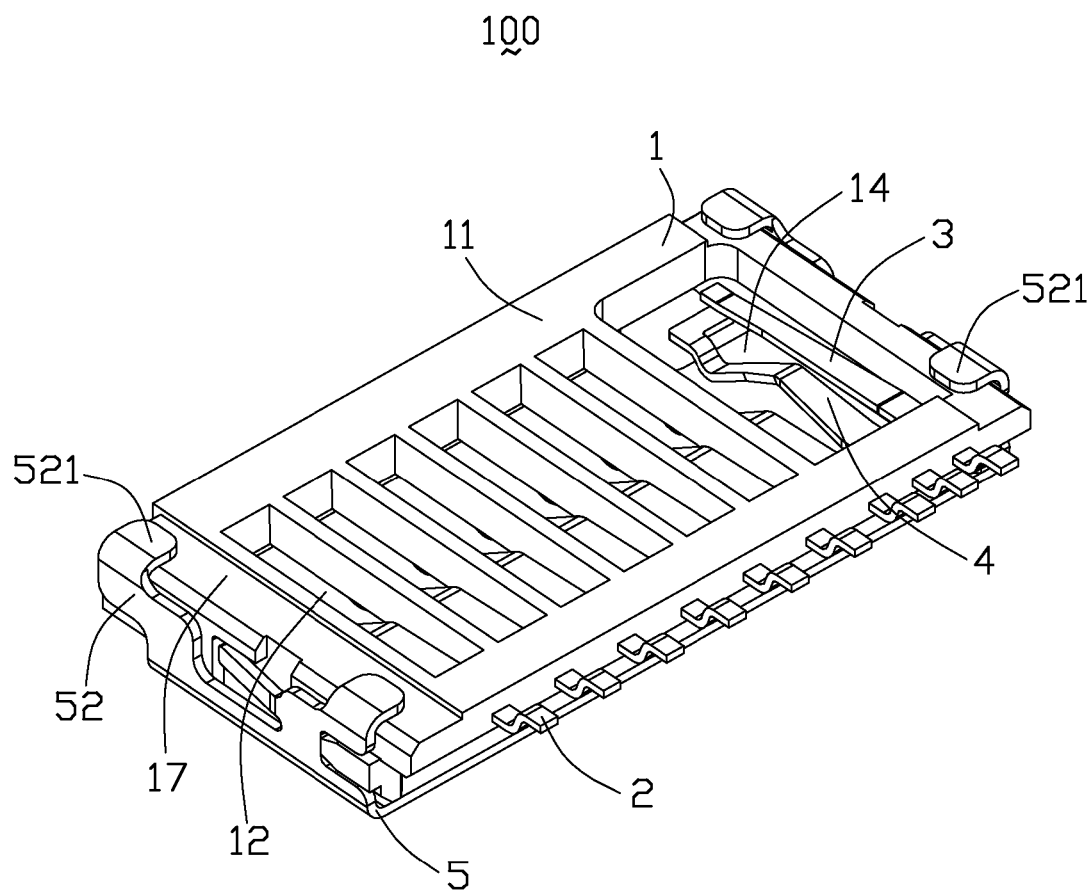
FIG. 2 is another assembled perspective view of the electrical connector, taken from another aspect.
Figure 3:
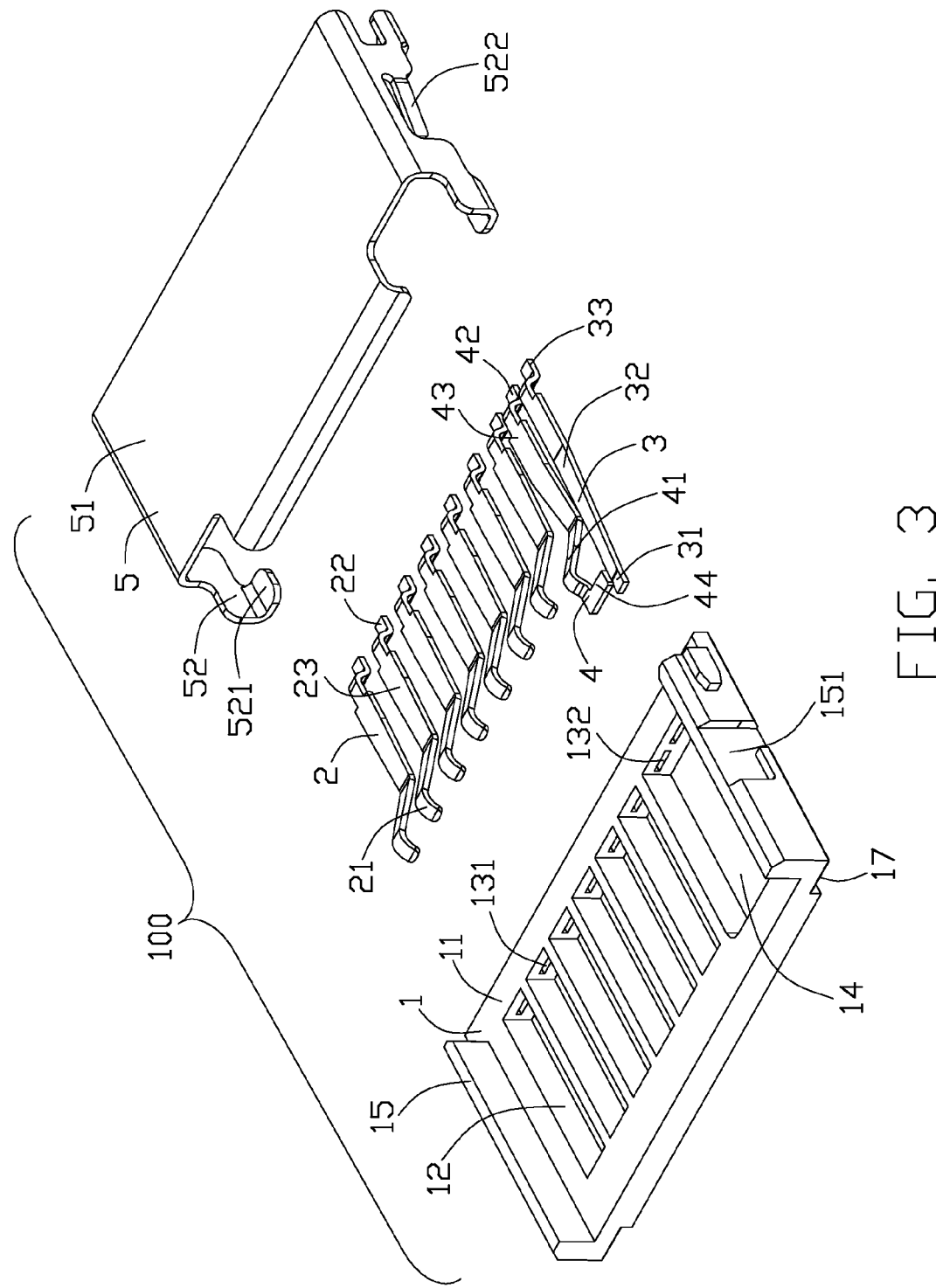
FIG. 3 is an exploded perspective view of the electrical connector as shown in FIG. 1.

Reference will now be made to the drawing figures to describe the present invention in detail. Referring to FIGS. 1-3, an electrical connector 100 made in accordance with the preferred embodiment of the present invention comprises an insulative housing 1, a plurality of conductive terminals 2, a first detecting terminal 4 and a second detecting terminal 5 mounted in the insulative housing 1, and a cover 5 attached to the insulative housing 1.

Referring to FIGS. 2 and 3, the insulative housing 1 comprises a base portion 11 and a pair of supporting walls 15 rising from the base portion 11. The base portion 11 has a plurality of passageways 12 and a channel 14 defined side-by-side. The channel 14 has a width greater than that of the passageway 12. The base portion 11 defines a plurality of first slits 131 each corresponding to each passageway 12, and a pair of second slits 132 corresponding to the channel 14. The base portion 11 has a pair of indentations 17 defined at a lower surface thereof. Each supporting wall 15 is defined with a groove 151 opened outwardly.

Referring to FIG. 3, each conductive terminal 2 comprises a curvilinear contact portion 21, a tail portion 22, and a body portion 23 between the contact portion 21 and the tail portion 22.

Figure 4:
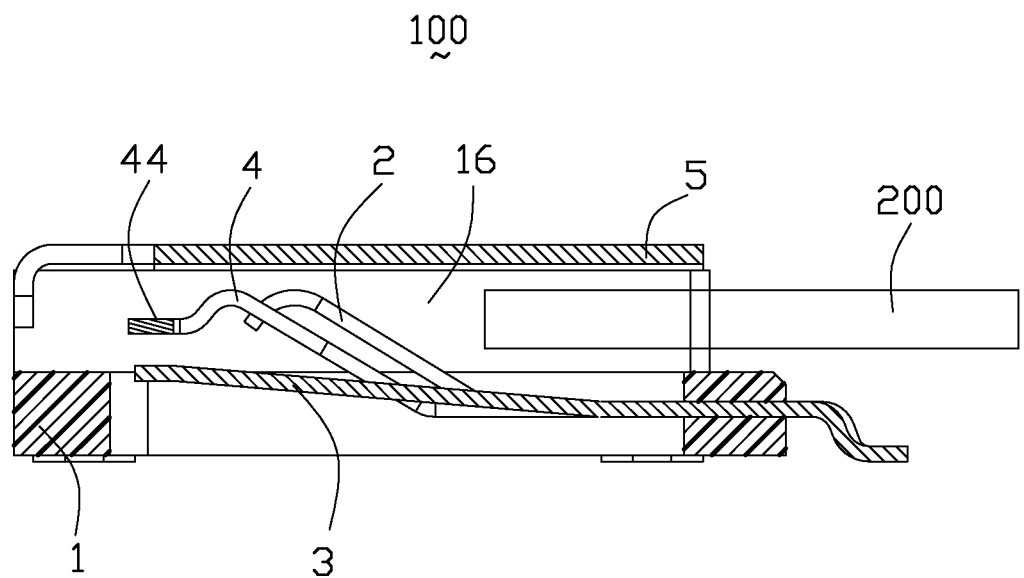
FIG. 4 is a cross-sectional view of the electrical connector as shown in FIG. 1, taken along line 4-4, when an electronic card is partially inserted.

The first detecting terminal 4 comprises a curvilinear contact portion 41, a tail portion 42, and a body portion 43 between the contact portion 41 and the tail portion 42. In conjunction with FIG. 4, the contact portion 41 of the first detecting terminal 4 is disposed forwardly of the contact 21 of the conductive terminal 2. The contact portion 41 of the first detecting terminal 4 is formed with an engaging portion 44 projecting toward the second detecting terminal 3.

The second detecting terminal 3 comprises a strip-shaped blade portion 32, a coupling portion 31 formed at a front end of the blade portion 32, and a soldering portion 33 extending rearwardly from another end of the blade portion 32.

The cover 5 comprises a top wall 51, and a pair of side walls 52 extending from opposite sides of the top wall 51. Each side wall 52 has a foot portion 521 and a resilient beam 522 bent from the side wall 52.

Figure 6:
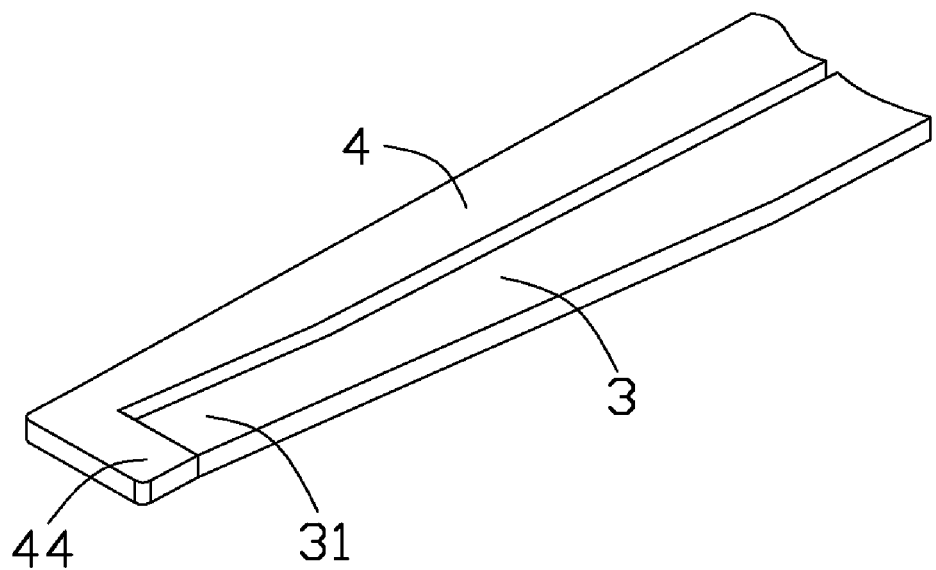
FIG. 6 is a view showing the first detecting terminal connecting with the second detecting terminal, before the first and the second detecting terminals are stamped from the carrier strip.

Referring to FIGS. 3 and 6, in a stamping process, the conductive terminals 2, the first detecting terminal 4 and the second detecting terminal 3 are stamped out from a same carrier strip and are arranged side-by-side. Referring to FIG. 6, the first detecting terminal 4 has an engaging portion 44 cut off from the second detecting terminal 3. When the engaging portion 44 is cut off, the second detecting terminal 3 is formed with the coupling portion 31, the blade portion 32 and the soldering portion 33 connected with each other. The body portions 23, 43 of the conductive terminals 2, the first detecting terminal 4 and the blade portion 32 of the second detecting terminal 3 are disposed coplanarly. In a forming process, the conductive terminals 2 and the first detecting terminal 4 have the front portions bent into a same angle by a same mold to form the contact portions 21, 41 having a same configuration. The engaging portion 44 of the first detecting terminal 4 is cantilevered above the coupling portion 31 of the second detecting terminal 3.

Referring to FIGS. 1-3, in the insert molding process, the conductive terminals 2, the first and the second detecting terminals 4, 3 are insert molded in the insulative housing 1. The conductive terminals 2 are exposed in the passageways 12. The first and the second detecting terminals 4, 3 are exposed in the channel 14.

The cover 5 is attached to the insulative housing 1, with the side walls 52 of the cover 5 secured to the supporting walls 15 of the insulative housing 1. The foot portions 521 are positioned in the indentations 17 and the resilient beams 522 resiliently abutting against the grooves 151. In conjunction with FIGS. 1 and 4, an inserting space 16 is defined between the base portion 11 and the top wall 51 for insertion of an electronic card 200.

Figure 5:
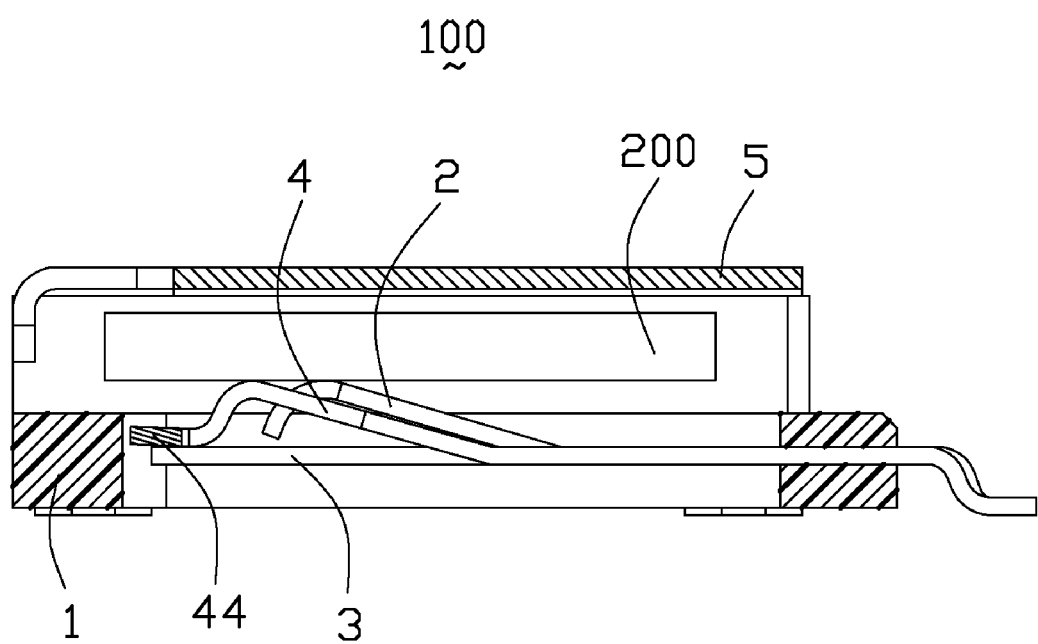
FIG. 5 is a cross-sectional view similar to FIG. 4, when the electronic card is completely inserted.

Referring to FIG. 5, when the electronic card 200 is inserted into the inserting space 16 till a predetermined position, the contact portions 21, 41 of the conductive terminals 2 and the first detecting terminal 4 are depressed downwardly by the electronic card 200. The engaging portion 44 of the first detecting terminal 4 moves downwardly to engage with the coupling portion 31 of the second detecting terminal 3 to perform detecting function.

The conductive terminals 2, the first detecting terminal 3 and the second detecting terminal 4 are stamped out from a same carrier strip. It is very beneficial as it reduces material cost and is easy to make the body portions 23, 43 and the blade portion 32 are coplanar to each other. Additionally, the engaging portion 44 is formed during the stamping process and the bending process. It doesn't need extra working process to provide the engaging portion 44. The contact portions 21, 41 of the conductive terminals 2 and the first detecting terminals 4 are bent into a same angle by a same mold. It needs only one mold to form the contact portions 21 of the conductive terminals 2 and the contact portions 41 of the first detecting terminal 4 simultaneously. The bending process has been simplified.

However, the disclosure is illustrative only, changes may be made in detail, especially in matter of shape, size, and arrangement of parts within the principles of the invention.

What is claimed is:

1. An electrical connector for insertion of a card, comprising:
    an insulative housing; and
    a plurality of terminals made from a same carrier strip, the terminals comprising a plurality of conductive terminals, a first and second detecting terminals arranged in the insulative housing in a juxtaposed manner, said conductive terminals and the first detecting terminal each having a front bent contact portion, said bent contact portions of the conductive terminals and the bent contact portion of the first detecting terminal having a substantially same configuration, said second detecting terminal being strip-like and having a coupling portion, said first detecting terminal having an engaging portion extending forwardly from the bent contact portion and laterally over the coupling portion of the second detecting terminal, the engaging portion being downwardly moveable together with the bent contact portion of the first detecting terminal to contact the coupling portion of the second detecting terminal.

2. The electrical connector as claimed in claim 1, wherein said conductive terminals and the first detecting terminal each have a soldering portion and a body portion connected with the bent contact portion and the soldering portion,
    wherein said second detecting terminal comprises a tail portion and a beam portion connected with the coupling portion and the tail portion, and
    wherein said body portions of the conductive terminals and the first detecting terminal, and the beam portion of the second detecting terminal are coplanar.

3. The electrical connector as claimed in claim 1, wherein said first detecting terminal is disposed between the second detecting terminal and the conductive terminals.

4. The electrical connector as claimed in claim 3, wherein said insulative housing defines a plurality of passageways, said conductive terminals being mounted in the insulative housing by insert molding and exposed in the passageways.

5. The electrical connector as claimed in claim 4, wherein said insulative housing defines a channel, said first and second detecting terminals mounted in the insulative housing by insert molding and exposed in the channel.

6. The electrical connector as claimed in claim 5, wherein said channel has a width greater than that of the passageway.

7. The electrical connector as claimed in claim 1, further comprising a cover, said insulative housing comprising a base portion and a pair of supporting walls, said cover attached to the supporting walls to form an inserting space between the cover and the base portion for insertion of a card.

* * * * *